Dec. 26, 1939.                    H. C. CRANE                    2,185,023
                               VIBRATION DAMPER
                              Filed March 2, 1939
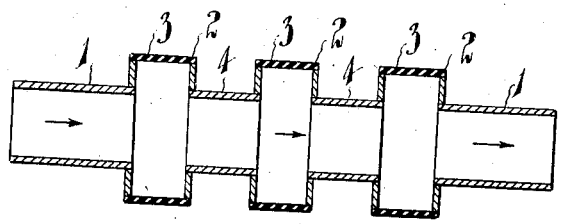
Fig. 1.
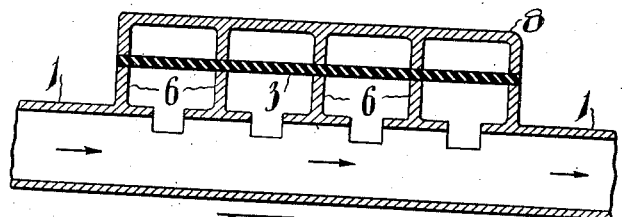
Fig. 2.
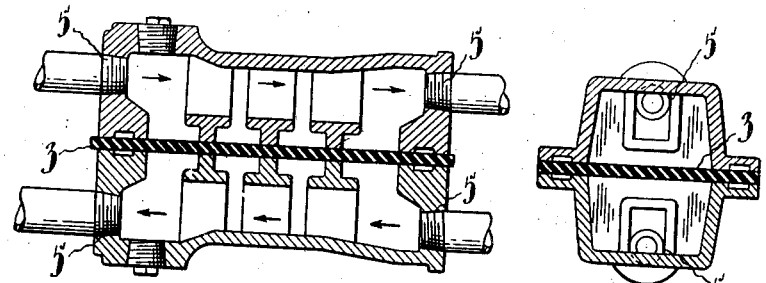   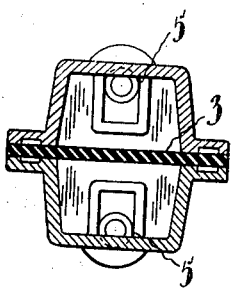
Fig. 3.         Fig. 4.
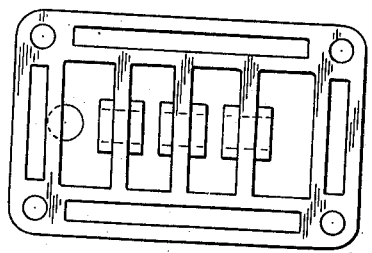
Fig. 5.
Inventor
H. C. Crane
By J. Edw. Mayba
ATTY Patented Dec. 26, 1939

2,185,023

UNITED STATES PATENT OFFICE 2,185,023

VIBRATION DAMPER

Harold C. Crane, Toronto, Ontario, Canada, assignor to Turnbull Elevator Company Limited, Toronto, Ontario, Canada Application March 2, 1939, Serial No. 259,482
In Canada September 13, 1938

1 Claim. (Cl. 138—30)

This invention relates to devices adapted for use in eliminating vibration noises caused by fluids flowing in conduits, and more particularly for use with hydraulically operated doors for elevators which are operated by means of a liquid which is circulated by means of a pump. The operation of the pump causes a surging of pressure in the liquid which sets up vibrations which cause disagreeable noises. My object therefore is to devise a vibration damper which will eliminate the cause of these noises.

I attain my object by means which may briefly be described as follows:

The device comprises a conduit, a plurality of chambers successively communicating with the conduit and resilient means forming at least part of the wall of each chamber adapted to vibrate to absorb variations in pressure in the fluid. In the preferred construction the passageway of the conduit is of such a size between the openings of said chambers into the conduit as to provide impedances in series while capacity is provided by the resilient means forming part of a wall of each chamber.

Usually in hydraulically operated door mechanism two conduits are employed in which the liquid flows in opposite directions and in different directions according as the doors are being opened or closed. A specific construction of the vibration absorber for use under the above conditions comprises two similar parts each including a passageway; two spaced series of chambers with which the passageways respectively communicate, the chambers of each series having inner sides arranged opposite the open inner sides of the chambers of the other series; and a plurality of resiliently spaced diaphragms each forming a closure common to the inner sides of two opposed chambers.

The invention is hereinafter more fully described and is illustrated in the accompanying drawing in which Fig. 1 is a diagrammatical longitudinal section of a vibration absorber constructed in accordance with my invention;

Fig. 2 a longitudinal section of the device as arranged with a single conduit;

Fig. 3 a similar view showing the arrangement with a double conduit;

Fig. 4 is a cross section on the line 4—4 in Fig. 3; and

Fig. 5 a plan view of the inner face of one-half of the device shown in Figs. 3 and 4.

In the drawing like numerals of reference indicate corresponding parts in the different figures.

Referring particularly to Fig. 1, 1 is a conduit or passageway provided with an inlet and an outlet at the ends. Intermediate of the ends expansions 2 forming chambers are formed alternated with the parts 4 which form a series of impedances affecting the flow of liquid through the device. A part at least of a wall of each of the chambers 2 is formed of a resilient diaphragm 3 or an equivalent spring loaded piston as will be understood by those versed in the art. The result is that there is provided impedances in series and capacity in shunt which effectively dampens vibration in the liquid flowing through the device whether caused by the operation of the pump or in other ways.

In Fig. 2 is shown an arrangement such as may actually be used with a single conduit. The chambers 2, it will be noted, are formed by partitions 6, which partitions are under cut as shown at 7 so that the walls formed by the diaphragms 3 are of considerably greater area than the openings between the chambers and the conduit or passageway. Preferably the diaphragms 3 are formed by a single piece of material which is held in position to close the outer sides of the chambers by means of the cover 8 which is formed with suitable ribs engaging and clamping the one-piece diaphragm against the outer sides of the chambers. The spaces in the cover may be filled with air, preferably under pressure, to relieve the outward pressure of the fluid flowing through the conduit and exerting its pressure through the fluid in the chambers. In this form, as will be seen, we have impedances in series and capacity in shunt as in the diagrammatic view previously described.

In Figs. 3, 4 and 5 I show a preferred form when two conduits are used in which the fluid is to be circulated first in one direction and then in the other.

The casing of the device in this form is shown in two substantially similar parts provided with the inlets and outlets 5. Two pipe connections are shown at one end of the device, but one only would, of course, be used, the other being suitably plugged.

The device, it will be seen, is simply a duplicate of the device as shown in Fig. 2, the integral diaphragm being clamped between the two parts of the device so that it forms a closure common to the inner sides of the pairs of opposed chambers. The parts of the device are held together by bolts passing through bolt holes provided at the corners of each part.

The air chambers of the form shown in Fig. 2 are, of course, not necessary in the double form of the device.

It is found in practice that the device as constructed satisfactorily attains the objects of the invention as set out in the preamble to the specification.

What I claim as my invention is:

A vibration damper for fluids flowing in conduits comprising two parallel passageways; two spaced series of chambers with which the passageways respectively communicate, the chambers of each series having open inner sides arranged opposite the open inner sides of the chambers of the other series; and a plurality of resiliently positioned diaphragms each forming a closure common to the inner sides of two opposed chambers.

HAROLD C. CRANE.